United States Patent
Okayama et al.

(10) Patent No.: US 7,745,004 B2
(45) Date of Patent: Jun. 29, 2010

(54) POLYMER-COATED MAGNETIC PARTICLE AND MAGNETIC MATERIAL FOR ABSORBING ELECTROMAGNETIC WAVES

(75) Inventors: Katsumi Okayama, Kanagawa (JP); Kaoru Kobayashi, Chiba (JP); Koichiro Inomata, c/o Graduate School of Engineering, Tohoku University, 02, Aza Aoba, Aramaki, Aoba-Ku, Sendai, Miyagi (JP); Satoshi Sugimoto, c/o Graduate School of Engineering, Tohoku University, 02, Aza Aoba, Aramaki, Aoba-Ku, Sendai, Miyagi (JP); Yoshihiro Kato, c/o Graduate School of Engineering, Tohoku University, 02, Aza Aoba, Aramaki, Aoba-Ku, Sendai, Miyagi (JP)

(73) Assignees: Sony Corporation, Tokyo (JP); Koichiro Inomata, Miyagi (JP); Satoshi Sugimoto, Miyagi (JP); Yoshihiro Kato, Miyagi (JP)

( * ) Notice: Subject to any disclaimer, the term of this patent is extended or adjusted under 35 U.S.C. 154(b) by 394 days.

(21) Appl. No.: 11/258,569

(22) Filed: Oct. 25, 2005

(65) Prior Publication Data

US 2006/0060027 A1    Mar. 23, 2006

Related U.S. Application Data

(62) Division of application No. 10/245,046, filed on Sep. 17, 2002, now Pat. No. 6,992,155.

(30) Foreign Application Priority Data

Sep. 18, 2001    (JP)    ............................. 2001-283324

(51) Int. Cl.
    *B32B 5/16*    (2006.01)
(52) U.S. Cl. ....................... 428/407; 428/327; 428/328; 428/329; 977/777; 977/783
(58) Field of Classification Search ................. 428/407, 428/403, 327, 328, 329; 977/777, 783
    See application file for complete search history.

(56) References Cited

U.S. PATENT DOCUMENTS 4,023,981 A * 5/1977 Perronin et al. ............. 524/850

(Continued)

FOREIGN PATENT DOCUMENTS

JP    2000-232014 A    8/2000

OTHER PUBLICATIONS

Martino A. et al., "The Synthesis and Characterization of Iron Colloid Catalysts in Inverse Micelle Solutions", Applied Catalysis A: General, Elsevier Science, Amsterdam, NI, vol. 161, No. 1-2, Nov. 4, 1991, pp. 235-248, cited by other.

(Continued)

*Primary Examiner*—H. (Holly) T Le
(74) *Attorney, Agent, or Firm*—Robert J. Depke; Rockey, Depke & Lyons, LLC

(57) ABSTRACT

A method for producing a magnetic particle forming a magnetic material for absorbing electromagnetic waves comprises the steps of mixing an organometallic complex or a metal salt with a chain polymer and dissolving the mixture in a solvent (step S1); raising the temperature of the mixture to reaction temperature (step S2), carrying out a reaction at the reaction temperature (step S3); and forming the magnetic particle having a structure that the periphery of each fine particle formed from the organometallic complex or the metal salt is surrounded by the chain polymer and recovering the formed magnetic particle after the reaction (step S4). The magnetic particle has a nanogranular structure to become a magnetic material for absorbing electromagnetic waves. Such a magnetic particle is produced by a wet reaction. Thus, a larger amount of magnetic particle can be produced by one reaction.

8 Claims, 10 Drawing Sheets

U.S. PATENT DOCUMENTS

| | | | | |
|---|---|---|---|---|
| 5,118,528 | A * | 6/1992 | Fessi et al. | 427/213.36 |
| 5,215,820 | A * | 6/1993 | Hosokawa et al. | 428/403 |
| 5,338,617 | A * | 8/1994 | Workinger et al. | 428/551 |
| 5,520,717 | A | 5/1996 | Miller et al. | |
| 5,607,768 | A * | 3/1997 | Lee | 428/403 |
| 5,766,764 | A * | 6/1998 | Olli et al. | 428/407 |
| 6,521,140 | B2 * | 2/2003 | Yoshida et al. | 252/62.54 |
| 6,720,074 | B2 * | 4/2004 | Zhang et al. | 428/842.4 |
| 6,773,800 | B2 * | 8/2004 | Hosoe et al. | 428/323 |
| 6,986,942 | B1 * | 1/2006 | Mayes | 428/327 |
| 6,992,155 | B2 * | 1/2006 | Okayama et al. | 526/183 |
| 7,115,688 | B1 * | 10/2006 | Mirkin et al. | 526/127 |
| 7,390,567 | B2 * | 6/2008 | Matsukawa et al. | 428/403 |

OTHER PUBLICATIONS

Ramos J. et al., "Production of Magnetic Nanoparticles in a Polyvinylpyridine Matrix", Polymer, Ensevier Science Publishers B.V. GB., vol. 41, No. 24, Nov. 2000, pp. 8461-8464.

* cited by examiner

| | ORGANO-METALLIC COMPLEX | CHAIN POLYMER | SOLVENT | REACTION TEMPERATURE (°C) | SATURATION MAGNETIZATION (emu/g) | AVERAGE PARTICLE DIAMETER (nm) |
|---|---|---|---|---|---|---|
| EXAMPLE 1 | Fe(CO)$_5$ | PVP | DMSO | 130 | 170 | 22.0 |
| EXAMPLE 2 | Fe(CO)$_5$ | PVP | DMSO | 150 | 174 | 19.0 |
| EXAMPLE 3 | Fe(CO)$_5$ | PVP | DMSO | 170 | 183 | 16.4 |
| EXAMPLE 4 | Fe(CO)$_5$ | PVP | DMSO | 189 | 194 | 11.5 |
| EXAMPLE 5 | Co$_2$(CO)$_8$ | PVP | ETHYLENE GLYCOL | 130 | 108 | 19.0 |
| EXAMPLE 6 | Co$_2$(CO)$_8$ | PVP | ETHYLENE GLYCOL | 150 | 111 | 12.0 |
| EXAMPLE 7 | Co$_2$(CO)$_8$ | PVP | ETHYLENE GLYCOL | 170 | 122 | 10.0 |
| EXAMPLE 8 | Co$_2$(CO)$_8$ | PVP | ETHYLENE GLYCOL | 195 | 113 | 13.0 |

PVP: POLY(N-VINYL-2-PYRROLIDONE)
DMSO: DIMETHYL SULFOXIDE

FIG.4

POLYMER-COATED MAGNETIC PARTICLE AND MAGNETIC MATERIAL FOR ABSORBING ELECTROMAGNETIC WAVES

The subject matter of application Ser. No. 10/245,046 is incorporated herein by reference. The present application is a divisional application of U.S. Ser. No. 10/245,046, filed Sep. 17, 2002 now U.S. Pat. No. 6,992,155, which claims priority to Japanese Patent Application No. JP 2001-283324 filed Sept. 18, 2001 which is incorporated herein by reference.

BACKGROUND OF THE INVENTION

1. Field of the Invention

The present invention relates to a method for producing magnetic particles and more particularly to a method for producing magnetic particles having structures that the peripheries of fine particles are surrounded by insulating materials.

2. Description of the Related Art

In recent years, compact and light-weight communication devices have been more increasingly developed as represented by portable telephones. Accordingly, parts mounted on the communication devices have been requested to be more compact and lighter. With the development of such small-sized communication devices, operating frequencies tend to rise.

For coping with the situation that the operating frequencies of the communication devices are liable to high, has been carried out an attempt the electric resistance of magnetic materials used for individual components of the communication devices such as transformers, inductors or magnetic heads is raised to reduce eddy current flowing through the magnetic materials themselves. As such magnetic materials, an amorphous alloy film in which metal and ceramics are sputtered at the same time to disperse the ceramics has been proposed in Japanese Patent Laid-Open Publication No. sho 60-152651 and Japanese Patent Laid-Open Publication No. hei 4-142710.

In a recent communication environment where the communication devices are used mutually at close positions, the high frequencies of the communication devices may possibly cause a communication quality to be deteriorated. Therefore, the components of the communication devices employ magnetic materials having higher magnetic permeability in a high frequency area to absorb unnecessary radio waves generated from the communication devices so that the deterioration of communication quality is prevented.

In order to realize the high magnetic permeability by such a radio wave absorber used in the communication device, the magnetic material forming the radio wave absorber needs to have a high saturation magnetization as well as a high electric resistance and the anisotropic magnetic field and the magnetostriction of a magnetic member need to be low. In recent years, people have paid their attention to a nanogranular structure as a structure of a magnetic material to achieve these properties at the same time. The magnetic material has a structure that the surface of each magnetic particle constituting the magnetic material is surrounded by a thin insulating film and these magnetic materials are connected together in a network form. With such a structure, grain boundary layers having a high resistance are formed between the magnetic particles to generate a high electric resistance and a high magnetic permeability is realized in a high frequency area while the magnetic particles, which are not isolated particles such as those of superparamagnetism, are brought to close to one another.

In recent years, as for the magnetic thin film having the nanogranular structure, Japanese Patent Laid-Open Publication No. hei 10-241938 discloses that a nanogranular thin film composed of a cobalt (Co) group has a magnetic permeability not higher than several hundred MHz. Further, according to a report concerning a magnetic permeability (J. Appl. Phys., Vol. 87, No. 2, 15 (2000), P187), a Co alloy thin film has a similar magnetic permeability.

However, the magnetic materials having the nanogranular structures which have been heretofore reported have been inconveniently limited to thin films using a sputtering method.

Reported values on the magnetic thin films having the nanogranular structures have been directed only for study of the materiality of one particle but for bulk materials. Further, an application study utilizing the magnetic thin film has been rarely performed. It has been especially difficult for the thin film to make a property of a radio wave absorber for electromagnetic waves in neighboring places compatible with a property as a radio wave absorber for electromagnetic waves in remote places.

Further, when the magnetic material having the nanogranular structure is manufactured, it is estimated that a thick film not thicker than about 100 μm can be manufactured by repeatedly carrying out sputtering operations using a method for manufacturing the magnetic thin film having the nanogranular structure. However, it takes high cost and long time to produce the magnetic material, and accordingly, this method for manufacturing the magnetic material is not realistic from an industrial point of view.

SUMMARY OF THE INVENTION

The present invention was devised by considering the above described problems and it is an object of the present invention to provide a method for producing a magnetic particle in which a magnetic particle forming a magnetic material capable of absorbing electromagnetic waves, particularly high frequency electromagnetic waves can be efficiently produced.

According to the present invention, there is provided a method for producing a magnetic particle which has a surface surrounded by an insulating material and forms a magnetic material for absorbing electromagnetic waves. The method for producing a magnetic particle comprises the steps of: mixing an organometallic complex or a metal salt with a chain polymer and dissolving the mixture in a solvent; raising the temperature of the mixture to reaction temperature; forming the magnetic particle having a structure that the periphery of each fine particle formed from the organometallic complex or the metal salt is surrounded by the chain polymer at the reaction temperature; and recovering the magnetic particle.

According to the above described method, the organometallic complex or the metal salt are mixed with the chain polymer and the mixture is dissolved in a solvent and the temperature of the mixture is raised to reaction temperalure at which a reaction is carried out. Thus, can be produced the magnetic particle having a structure that the periphery of each fine particle produced from the metal of the organometallic complex or the metal salt is surrounded by the chain polymer. As described above, the magnetic particle forming the magnetic material for absorbing electromagnetic waves is produced by a wet reaction, so that more magnetic particles can be produced by one reaction.

Further, according to the present invention, there is provided a magnetic particle forming a magnetic material for absorbing electromagnetic waves. The magnetic particle has a structure that the periphery of each fine particle whose particle diameter is located within a range of 1 nm to 50 nm is surrounded by the chain polymer.

In case the magnetic particle having such a structure is used as the magnetic material, when respective magnetic particles are connected together in a network form, there is formed a nanogranular structure that grain boundary layers of high resistance due to the chain polymers exist between the magnetic particles. Thus, the magnetic material having a property for absorbing electromagnetic waves can be provided.

Further, according to the present invention, there is provided a magnetic material for absorbing electromagnetic waves. The magnetic material comprises powder composed of a magnetic particle having fine particles whose particle diameter ranges from 1 nm to 50 nm and whose peripheries are surrounded by chain polymers and occupying 30% to 90% in terms of volume filling rate, and a polymer material occupying the rest.

The magnetic material having the above described structure can be formed to an arbitrary shape, for instance, a sheet form, and can be applied to materials of various kinds of parts for absorbing the electromagnetic waves.

Still further, according to the present invention, there is provided a magnetic material for absorbing electromagnetic waves formed by pressing powder of a magnetic particle in which the periphery of each fine particle whose particle diameter ranges from 1 nm to 50 nm is surrounded by a chain polymer.

As described above, the powder of the magnetic particle is compressed so that a nanogranular structure that grain boundary layers of high resistance by the chain polymers are located between the magnetic particles is formed to achieve a property for absorbing electromagnetic waves.

BRIEF DESCRIPTION OF THE DRAWINGS

The object and other objects and advantages of the present invention will appear more clearly from the following specification in conjunction with the accompanying drawings in which:

FIG. 4 shows the measured results of the saturation magnetization and average particle diameter of magnetic powder obtained under reaction conditions of Examples 1 to 8.

DETAILED DESCRIPTION OF THE PREFERRED EMBODIMENTS

Now, embodiments of the present invention will be described below by referring to the accompanying drawings.

Figure 1:
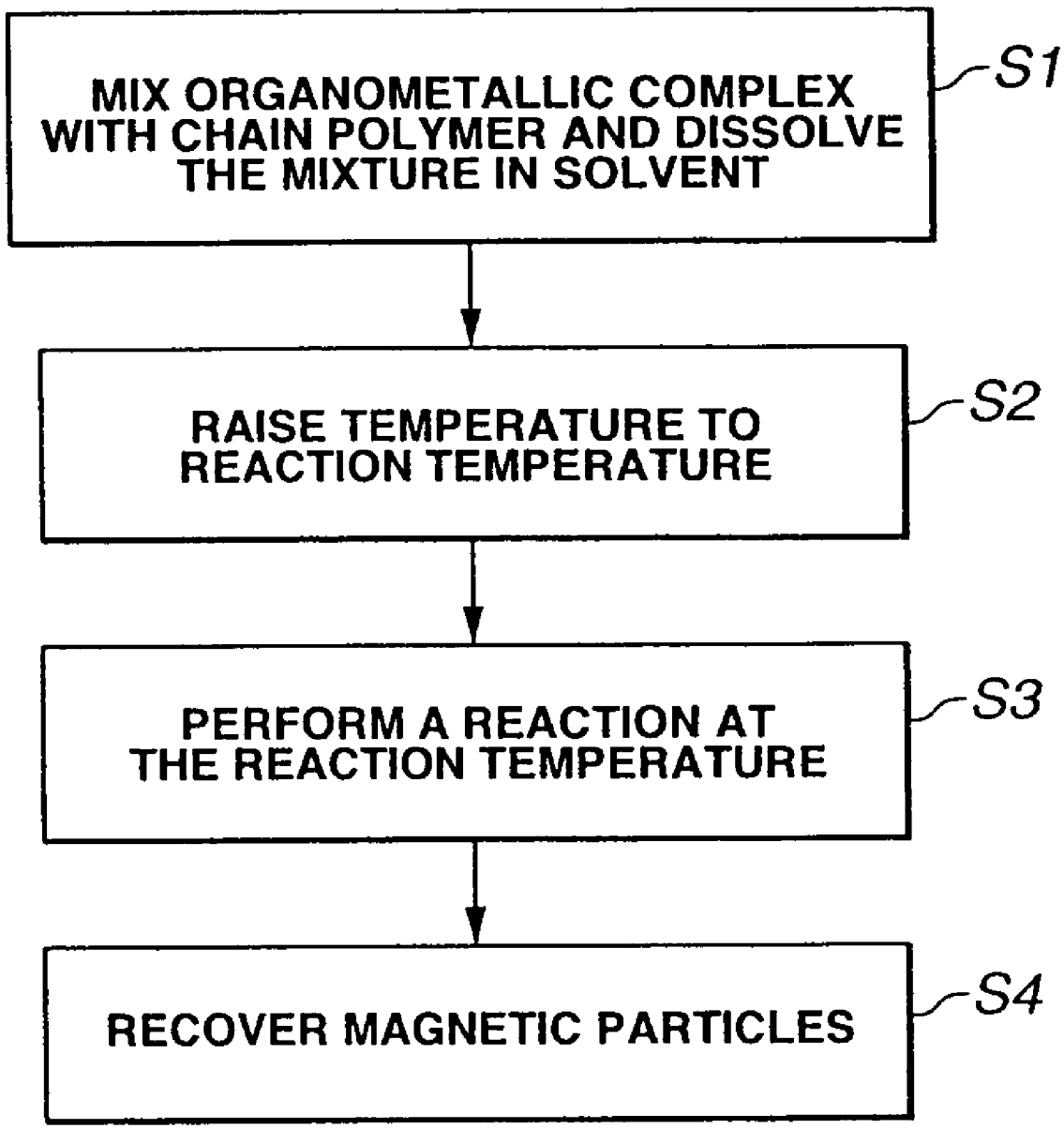
FIG. 1 is a flow chart of a method for producing a magnetic particle.

FIG. 1 is a flow chart of a method for producing magnetic particles. The magnetic particles which form a magnetic material for absorbing electromagnetic waves are produced by carrying out the steps of mixing an organometallic complex or a metal salt with a chain polymer and dissolving the mixture in a solvent (step S1); raising the temperature of the mixture to reaction temperature while the solution is agitated (step S2), carrying out a reaction while the solution is agitated for a prescribed time at the reaction temperature (step S3); and forming the magnetic particles having a structure that the periphery of each fine particle formed from the organometallic complex or the metal salt is surrounded by the chain polymer and recovering the formed magnetic particles after the reaction (step S4).

In the method for producing the magnetic particles, as the organometallic complex, there are used aqueous solutions of metal carbonyl such as iron pentacarbonyl ($Fe(CO)_5$), dicobalt octacarbonyl ($Co_2(CO)_8$) and nickel tetracarbonyl ($Ni(CO)_4$) or metal salts such as iron (II) chloride ($FeCl_2$), cobalt (II) chloride ($CoCl_2$), cobalt (III) chloride ($COCl_3$), nickel (II) chloride ($NiCl_2$), etc. and hydrates of these metal salts.

As the chain polymers, there are used poly(N-vinyl-2-pyrrolidone) having a carbonyl group (called it "PVP", hereinafter) or polyacrylic acid (($CH_2CH(COOH))_n$), etc. The structure of PVP is shown in a below-described chemical formula (1).

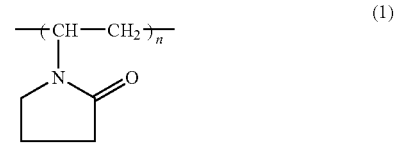

(1)

The chain polymers to be used are suitably selected depending on desired particle size and reaction conditions. When PVP is used for the chain polymer, there are employed those of molecular weight of 10000, 29000, 40000 and 130000.

Here, the ratio the amount of metal of the organometallic complex or the metal salt included in a solution to the amount of chain polymer similarly included in the solution is controlled within a range of 1:1 to 1:20.

As the solvent for dissolving the organometallic complex or the metal salt and the chain polymer, there can be used high purity alcohols or ethers. As the alcohols, there may be preferably used methanol ($CH_3OH$), ethanol ($C_2H_5OH$), and propanol ($C_3H_8OH$). As the ether, there may be preferably used diethyl ether (($C_2H_5)_2O$). Besides, ethylene glycol (($CH_2OH)_2$) having boiling point of 197.85° C.), dimethyl sulfoxide (($CH_3)_2S^+O^-$) having boiling point of 189.0° C. and called it "DMSO", hereinafter.) may be preferably employed. The structure of DMSO is shown in a below-described chemical formula (2).

(2)

Further, as the solvent, there may be preferably used hydrocarbons capable of existing in a liquid state depending on reaction conditions, such as toluene (($C_6H_5CH_3$) having boiling point of 110.6° C.), kerosine (having boiling point of 150° C. to 280° C.), etc.

The property of the magnetic material to be manufactured is slightly changed depending on the amount of the solvent. In this embodiment, a suitable amount of the solvent indicates an amount in which the organometallic complex or the metal salt and the chain polymer as solutes can be completely dissolved.

Figure 2A:
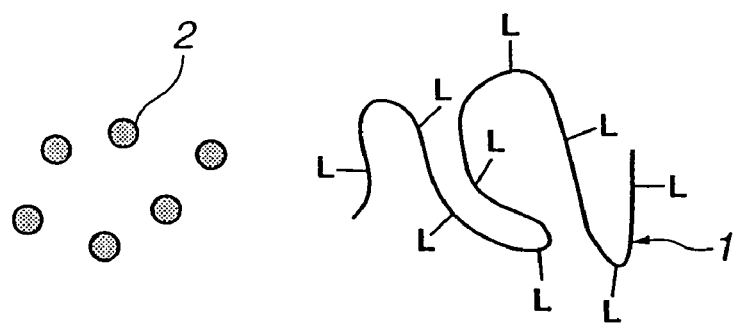
FIG. 2A-2D is a schematic diagram for explaining steps of producing magnetic particles.
Figure 2B:
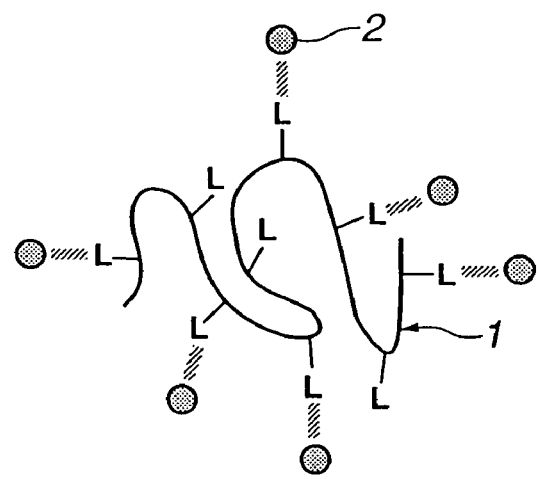
Figure 2C:
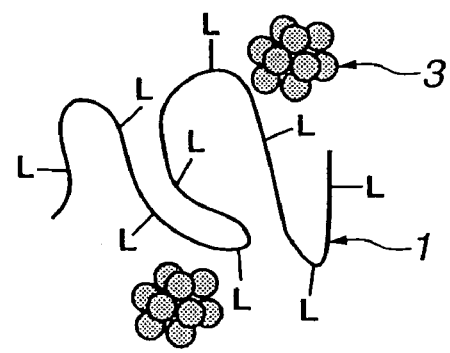
Figure 2D:
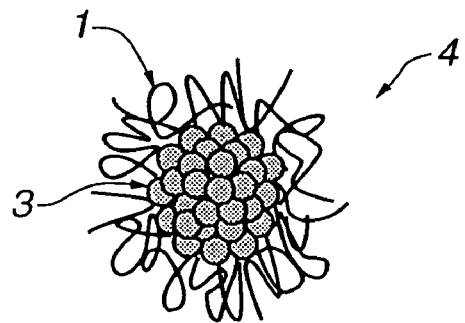

The organometallic complex or the metal salt is made to react with the chain polymer under prescribed conditions to produce the magnetic particles. FIG. 2 is a schematic view for explaining the steps of producing the magnetic particles. In this case, FIG. 2 shows an example in which the magnetic particles are formed from the organometallic complex or the metal salt of an Fe group and the PVP. FIG. 2A shows a state before a reaction. FIG. 2B shows a state in which Fe atoms or Fe ions and the PVP are coordinated. FIG. 2C shows a state in which Fe particles grow. FIG. 2D shows a state in which the magnetic particles are produced.

Unpaired electrons are present in oxygen (O) atoms of pyrrolidone groups included in PVP 1 dissolved in the solvent and serve as Lewis acid. In FIG. 2, parts serving as the Lewis acid in the PVP 1 are designated by L.

Firstly, as shown in FIG. 2B, the Fe atoms or the Fe ions 2 likewise dissolved in the solvent through the unpaired electrons of the O atoms are coordinate-bonded to the PVP 1.

As a reaction proceeds, the Fe atoms or the Fe ions 2 coordinated with the PVP 1 aggregate together to grow in the solvent. Then, as shown in FIG. 2C, the Fe particles 3 are formed. As the reaction further proceeds, the Fe particles 3 aggregate together, or the Fe particles 3 and the Fe atoms or the Fe ions 2 aggregate together so that the Fe particles 3 further grow.

With the growth of the Fe particles 3, the form of the PVP 1 coordinated with the Fe particles 3 is also gradually changed to surround the Fe particles 3. Then, finally, is formed a magnetic particle 4 having a structure that the peripheries of the Fe particles 3 are surrounded by the PVP 1 as shown in FIG. 2D.

The particle size of the magnetic particle 4 formed at this time is different depending on the kind of a solvent to be used, reaction temperature, reaction time and the molecular weight of the PVP 1. The particle size is especially greatly dependent on the kind and concentration of the solvent. For example, when an alcohol is used as a solvent, the Fe atoms or Fe ions 2 or the Fe particles 3 are liable to be surrounded by the PVP 1 during an initial step of the reaction. Accordingly, the growth of the Fe particles 3 is prevented. Finally, an ultra-fine magnetic particle 4 of about 0.1 nm is apt to be produced. As the concentration of the alcohol becomes high, this tendency obviously appears. On the contrary, when the concentration of the solvent is lowered, the magnetic particle 4 of several ten nm is finally produced. As apparent from the above-described fact, the kind and concentration of the solvent are properly selected, so that the particle size of the magnetic particle 4 can be conveniently controlled.

Further, the particle size of the magnetic particle 4 can be likewise controlled depending on whether the molecular weight of the PVP 1 is large or small as well as the control of the particle size by the solvent. In this case, when the molecular weight of the PVP 1 is large, much time is needed until the PVP 1 surrounds the peripheries of the Fe particles 3. During that time, since the growth of the Fe particles 3 is advanced, the final particle size of the magnetic particle 4 is increased.

In FIG. 2, although the example in which the Fe particles 3 whose peripheries are surrounded by the PVP 1 are formed is described, it is to be understood that the same producing steps are likewise carried out when Co particles or nickel (Ni) particles are formed. Further, when the Co particles or the Ni particles are formed, the control of the particle size depending on the kind and concentration of a solvent to be used at that time or the control of the particle size by the molecular weight of the PVP 1 shows the same effects as those when the Fe particles 3 are formed.

Further, when electric field of about 10 V/cm is applied to a reactor during the producing steps of the magnetic particle composed of these Fe, Co or Ni fine particles and the PVP, the density of the fine particles dispersed in the solution is changed depending on the applied time of the electric field. When the applied time is increased, there is generated in the solution an area in which the density of the fine particles is high. The use of this method makes it possible to increase the frequency of collision between the fine particles, or between the metal atoms or metal ions and the fine particles. Consequently, the producing speed of the magnetic particle can be accelerated. At this time, the magnitude of the applied electric field and the applied time are adequately selected so that the particle size of the magnetic particle or the reaction time can be controlled.

Figure 3:
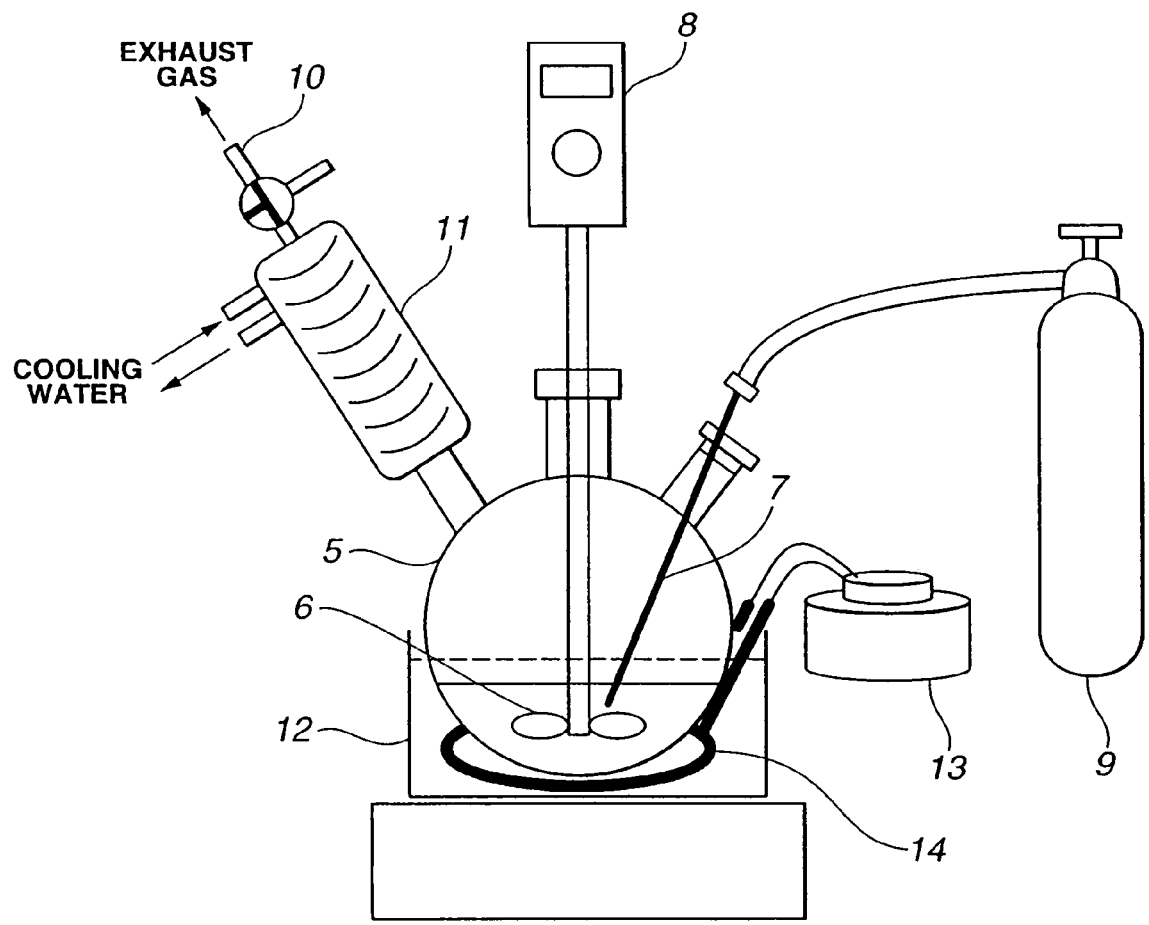
FIG. 3 is a schematic view of a reactor for producing magnetic particles.

FIG. 3 is a schematic view of a reactor for producing the magnetic particle. In this embodiment, a three-neck flask 5 is used as a reaction vessel for producing the magnetic particle. An agitating vane 6 is provided at one position of three ports in the flask 5. A nozzle 7 is provided in one of other ports. The agitating vane 6 is rotated by a mechanical agitator 8 to agitate solution with which the flask 5 is filled. The nozzle 7 is connected to an argon (Ar) cylinder 9 disposed outside the flask 5 to supply Ar gas to the flask 5. Further, a remaining port of the flask 5 serves as an exhaust port 10 of Ar gas entering the flask 5. In a path extending to the exhaust port 10, there is provided a cooler 11 for allowing cooling water to flow in order to prevent vapor generated by heating the flask 5 from being emitted outside the flask 5.

The flask 5 is disposed in a vessel 12 in which water is contained. Then, water in the vessel 12 is heated by a heater 14 powered by a power supply 13 so that the flask 5 is substantially uniformly heated.

The magnetic particle is produced by using the reactor having the above-described structure. Initially, the flask 5 is filled with the organometallic complex or the metal salt, the chain polymer and the solvent at room temperature. The Ar gas of the Ar cylinder 9 is continuously supplied to the flask 5 from the nozzle 7. Gas in the flask 5 is replaced by the Ar gas to obtain an Ar gas atmosphere in the flask 5. The gas contained in the flask 5 and the Ar gas supplied to the flask 5 are exhausted from the exhaust port 10. Then, the water in the vessel 12 is heated by the heater 14 to heat the liquid in the flask 5 to the temperature of 30° C. to 50° C., preferably substantially to 40° C. so that the organometallic complex or the metal salt and the chain polymer are completely dissolved in the solvent. After they are dissolved in the solvent, the temperature of the obtained solution is raised by the heater 14 to a prescribed reaction temperature located between 100° C.

and the boiling point of the solvent to be used. Subsequently, the agitating vane 6 is rotated by the mechanical agitator 8 to agitate the solution in the flask 5 and perform a reaction.

After the reaction is completed, while the flask 5 is sealed, the entire body of the flask 5 is moved to a glove box having an Ar gas atmosphere to recover a produced magnetic particle. In this case, a magnet is firstly allowed to come near the outer wall of the flask 5 in the glove box. Thus, since the magnetic particles dispersed in the flask 5 are attracted to the magnet, the liquid in the flask 5 is removed by, for instance, inclining the flask 5 under this state. According to this embodiment, a method for recovering the magnetic particles by using the magnet is called a magnetic field mineral processing. After the magnetic field mineral processing, the remaining solvent is finally completely removed to recover the produced magnetic particles. In order to accelerate a drying speed, the solvent may be removed by reducing pressure in the flask 5.

Then, the average particle diameter of the obtained magnetic particles is obtained from an X-ray diffraction measurement. Further, the particle diameter is measured under an observation by the use of a transmission electron microscope (TEM).

As a result of the observation by the TEM, the magnetic particles obtained after the removal of the solvent in the flask 5 have a structure of secondary particles mutually aggregating that includes agglomerate forms such as a granular form having the diameter of 5 μm to 200 μm, a flake form having the diameter of 5 μm to 200 μm and the thickness of 0.5 μm to 5 μm and a disc form having the diameter of 5 μm to 150 μm and the thickness of 0.1 μm to 5 μm. The agglomerates of the magnetic particles having the above-described forms are pulverized to obtain magnetic powder. The average particle diameter of the magnetic particles is measured under the X-ray diffraction by using the magnetic powder obtained after pulverizing. The average particle diameter is obtained in accordance with a Scherrer formula by employing the results of the X-ray diffraction measurement. Further, the magnetic powder is used to measure the saturation magnetization by a saturation magnetization measurement device.

In the above description, although the Ar gas is continuously supplied to the flask 5 to exhaust the Ar gas from the exhaust port 10, the magnetic particles may be produced in accordance with a batch type by improving the air-tightness of a reaction vessel to be used.

Further, according to the present invention, although the magnetic particles are formed in the Ar gas atmosphere for preventing the magnetic particles to be formed from being oxidized, it is to be understood that gas to be used is not limited to the Ar gas, and other gas having an oxidation inhibiting effect such as other inert gas may be employed.

EXAMPLES

Now, Examples of the present embodiment will be described below.

Example 1

Initially, $Fe(CO)_5$ as an organometallic complex, a PVP as a chain polymer and DMSO as a solvent are supplied to a flask at room temperature. Here, Fe and PVP are dissolved in the solution in the mass ratio Fe:PVP=1:10. The amount of DMSO as the solvent is determined to be an amount in which $Fe(CO)_5$ and the PVP as solutes can be completely dissolved.

Then, Ar gas is allowed to flow in the flask to replace gas in the flask by the Ar gas and obtain an Ar gas atmosphere. Then, a heater is heated to obtain the temperature of liquid at 40° C. and completely dissolve $Fe(CO)_5$ and the PVP in DMSO. After they are dissolved in DMSO, the liquid is continuously heated to reaction temperature of 130° C. and agitated to carry out a reaction.

After the reaction is completed, all the flask is directly moved to a glove box under an Ar gas atmosphere to leave produced magnetic particles in accordance with a magnetic field mineral processing in the flask and remove the rest. After that, the magnetic particles left in the flask are completely dried and the dried magnetic particles are recovered. The magnetic particles recovered in agglomerates are pulverized to obtain magnetic powder.

FIG. 4 shows the measured results of the saturation magnetization and the average particle diameter of the magnetic powder obtained under the reaction conditions in the Example 1. The saturation magnetization of the obtained magnetic powder is 170 emu/g and the average particle diameter of the magnetic powder is 22.0 nm. Further, the particle diameter of an Fe particle at the center of the magnetic particles is located within a range of 1 nm to 50 nm. The thickness of the PVP which surrounds the Fe particles can be set to 1 nm or smaller in accordance with a calculation. Thus, the magnetic particle in which the Fe particles are surrounded by an extremely thin PVP is produced.

Example 2

$Fe(CO)_5$, PVP and DMSO described in the above Example 1 are used and a reaction is carried out at the reaction temperature of 150° C. The amount of materials in the solution and other procedures are the same as those of the Example 1.

The measured results of the saturation magnetization and the average particle diameter of the magnetic powder obtained under the reaction conditions in the Example 2 are shown in FIG. 4. The saturation magnetization of the obtained magnetic powder is 174 emu/g and the average particle diameter of the magnetic powder is 19.0 nm. Further, the particle diameter of an Fe particle at the center of the magnetic particles is located within a range of 1 nm to 50 nm.

Example 3

$Fe(CO)_5$, PVP and DMSO described in the above Example 1 are used and a reaction is carried out at the reaction temperature of 170° C. The amount of materials in the solution and other procedures are the same as those of the Example 1.

The measured results of the saturation magnetization and the average particle diameter of the magnetic powder obtained under the reaction conditions in the Example 3 are shown in FIG. 4. The saturation magnetization of the obtained magnetic powder is 183 emu/g and the average particle diameter of the magnetic powder is 16.4 nm. Further, the particle diameter of an Fe particle at the center of the magnetic particles is located within a range of 1 nm to 50 nm.

Example 4

$Fe(CO)_5$, PVP and DMSO described in the above Example 1 are used and a reaction is carried out at the reaction temperature of 189° C. The amount of materials in the solution and other procedures are the same as those of the Example 1.

The measured results of the saturation magnetization and the average particle diameter of the magnetic powder obtained under the reaction conditions in the Example 4 are shown in FIG. 4. The saturation magnetization of the obtained magnetic powder is 194 emu/g and the average particle diameter of the magnetic powder is 11.5 nm. Further, the particle diameter of an Fe particle at the center of the magnetic particles is located within a range of 1 nm to 50 nm.

Example 5

Initially, $CO_2(CO)_8$ as an organometallic complex, a PVP as a chain polymer and ethylene glycol as a solvent are supplied to a flask at room temperature. Here, materials are dissolved in the solution in the mass ratio Co:PVP=1:10. The amount of ethylene glycol as the solvent is determined to be an amount in which $CO_2(CO)_8$ and the PVP as solutes can be completely dissolved.

Then, Ar gas is allowed to flow in the flask to replace gas in the flask by the Ar gas and obtain an Ar gas atmosphere. Then, a heater is heated to obtain the temperature of liquid at 40° C. and completely dissolve $CO_2(CO)_8$ and the PVP in ethylene glycol. After they are dissolved in ethylene glycol, the liquid is continuously heated to reaction temperature of 130° C. and agitated to carry out a reaction.

After the reaction is completed, all the flask is directly moved to a glove box under an Ar gas atmosphere to leave produced magnetic particles in accordance with a magnetic field mineral processing in the flask and remove the rest. After that, the magnetic particles left in the flask are completely dried and the dried magnetic particles are recovered. The magnetic particles recovered in agglomerates are pulverized to obtain magnetic powder.

FIG. 4 shows the measured results of the saturation magnetization and the average particle diameter of the magnetic powder obtained under the reaction conditions in the Example 5. The saturation magnetization of the obtained magnetic powder is 108 emu/g and the average particle diameter of the magnetic powder is 19.0 nm. Further, the particle diameter of a Co particle at the center of the magnetic particles is located within a range of 1 nm to 50 nm.

Example 6

$CO_2(CO)_8$, PVP and ethylene glycol described in the above Example 5 are used and a reaction is carried out at the reaction temperature of 150° C. The amount of materials in the solution and other procedures are the same as those of the Example 5.

The measured results of the saturation magnetization and the average particle diameter of the magnetic powder obtained under the reaction conditions in the Example 6 are shown in FIG. 4. The saturation magnetization of the obtained magnetic powder is 111 emu/g and the average particle diameter of the magnetic powder is 12.0 nm. Further, the particle diameter of a Co particle at the center of the magnetic particles is located within a range of 1 nm to 50 nm.

Example 7

$CO_2(CO)_8$, PVP and ethylene glycol described in the above Example 5 are used and a reaction is carried out at the reaction temperature of 170° C. The amount of materials in the solution and other procedures are the same as those of the Example 5.

The measured results of the saturation magnetization and the average particle diameter of the magnetic powder obtained under the reaction conditions in the Example 7 are shown in FIG. 4. The saturation magnetization of the obtained magnetic powder is 122 emu/g and the average particle diameter of the magnetic powder is 10.0 nm. Further, the particle diameter of a Co particle at the center of the magnetic particles is located within a range of 1 nm to 50 nm.

Example 8

$CO_2(CO)_8$, PVP and ethylene glycol described in the above Example 5 are used and a reaction is carried out at the reaction temperature of 195° C. The amount of materials in the solution and other procedures are the same as those of the Example 5.

The measured results of the saturation magnetization and the average particle diameter of the magnetic powder obtained under the reaction conditions in the Example 8 are shown in FIG. 4. The saturation magnetization of the obtained magnetic powder is 113 emu/g and the average particle diameter of the magnetic powder is 13.0 nm. Further, the particle diameter of a Co particle at the center of the magnetic particles is located within a range of 1 nm to 50 nm.

Figure 5:
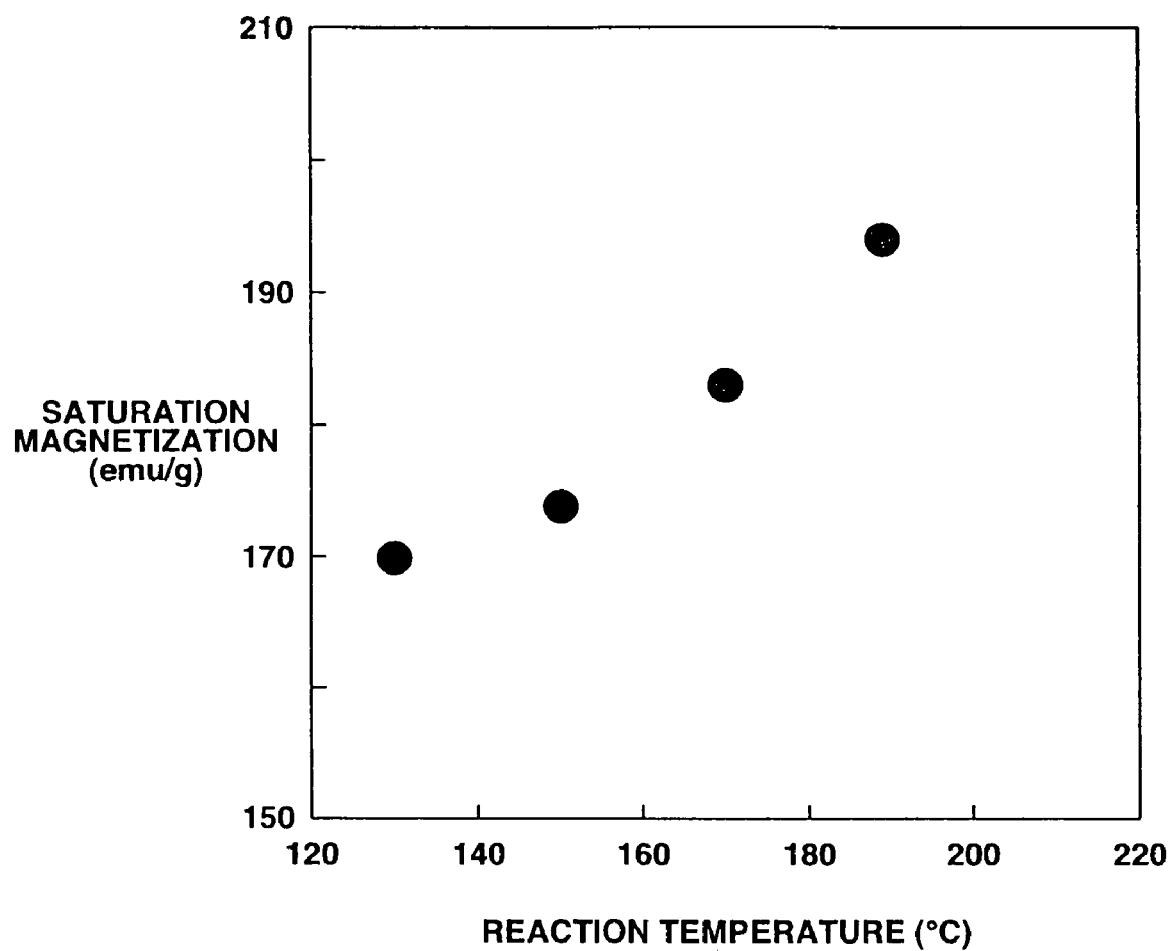
FIG. 5 shows a relation between the reaction temperature and the saturation magnetization obtained in the Examples 1 to 4.
Figure 6:
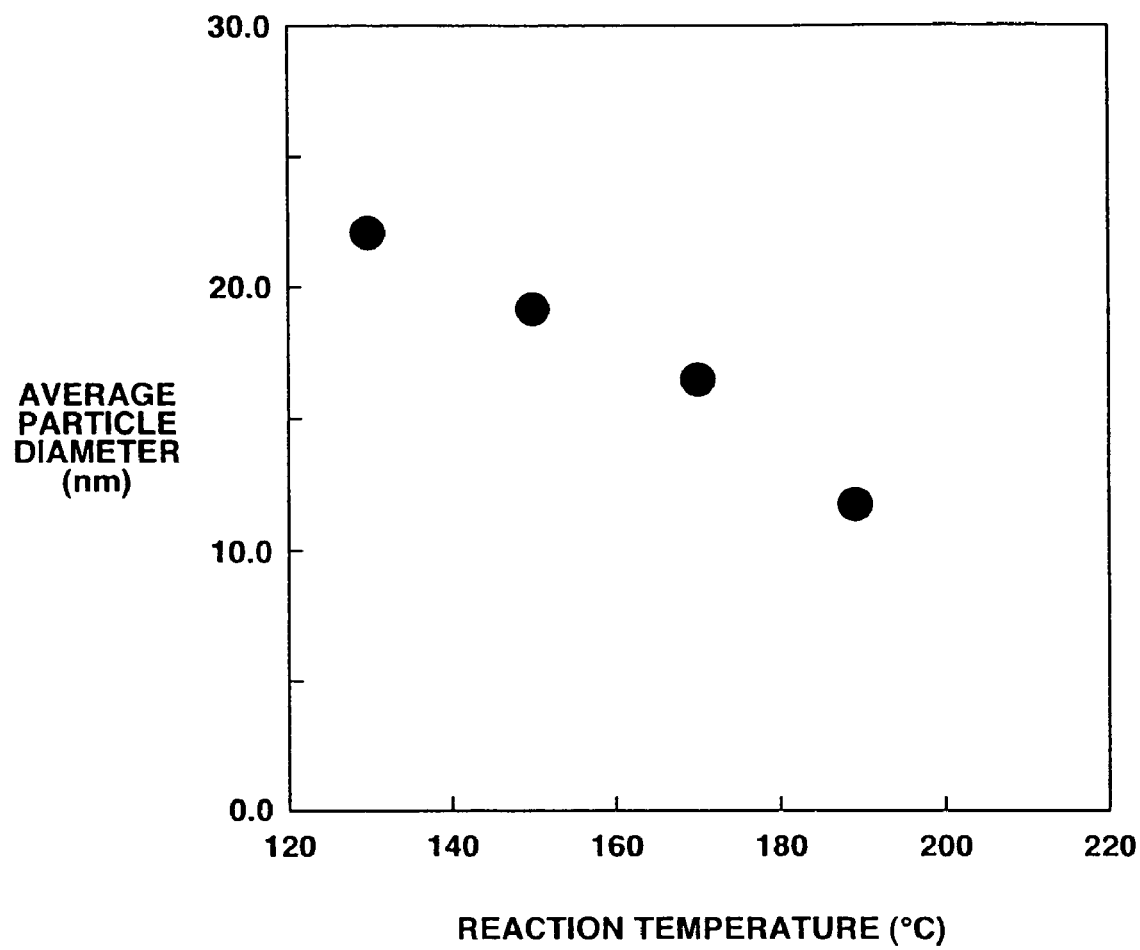
FIG. 6 shows a relation between the reaction temperature and the average particle diameter obtained in the Examples 1 to 4.
Figure 7:
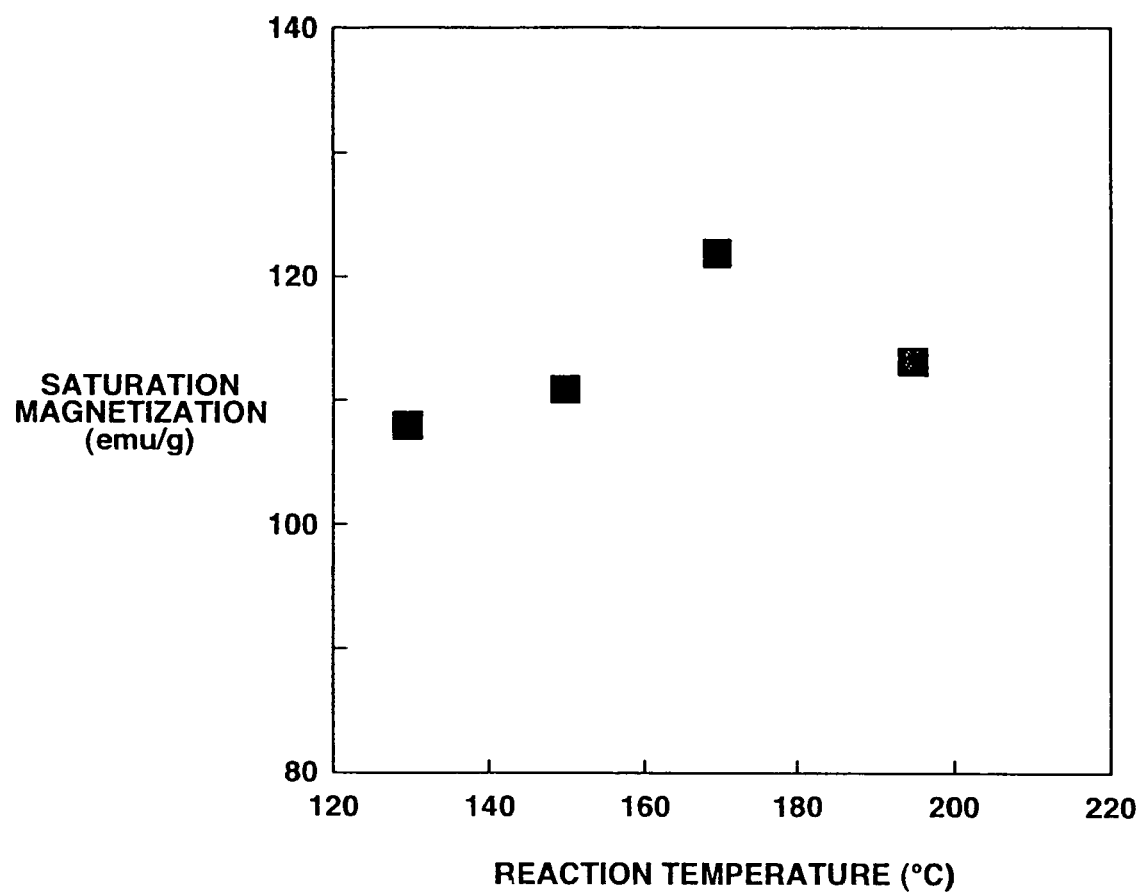
FIG. 7 shows a relation between the reaction temperature and the saturation magnetization obtained in the Examples 5 to 8.
Figure 8:
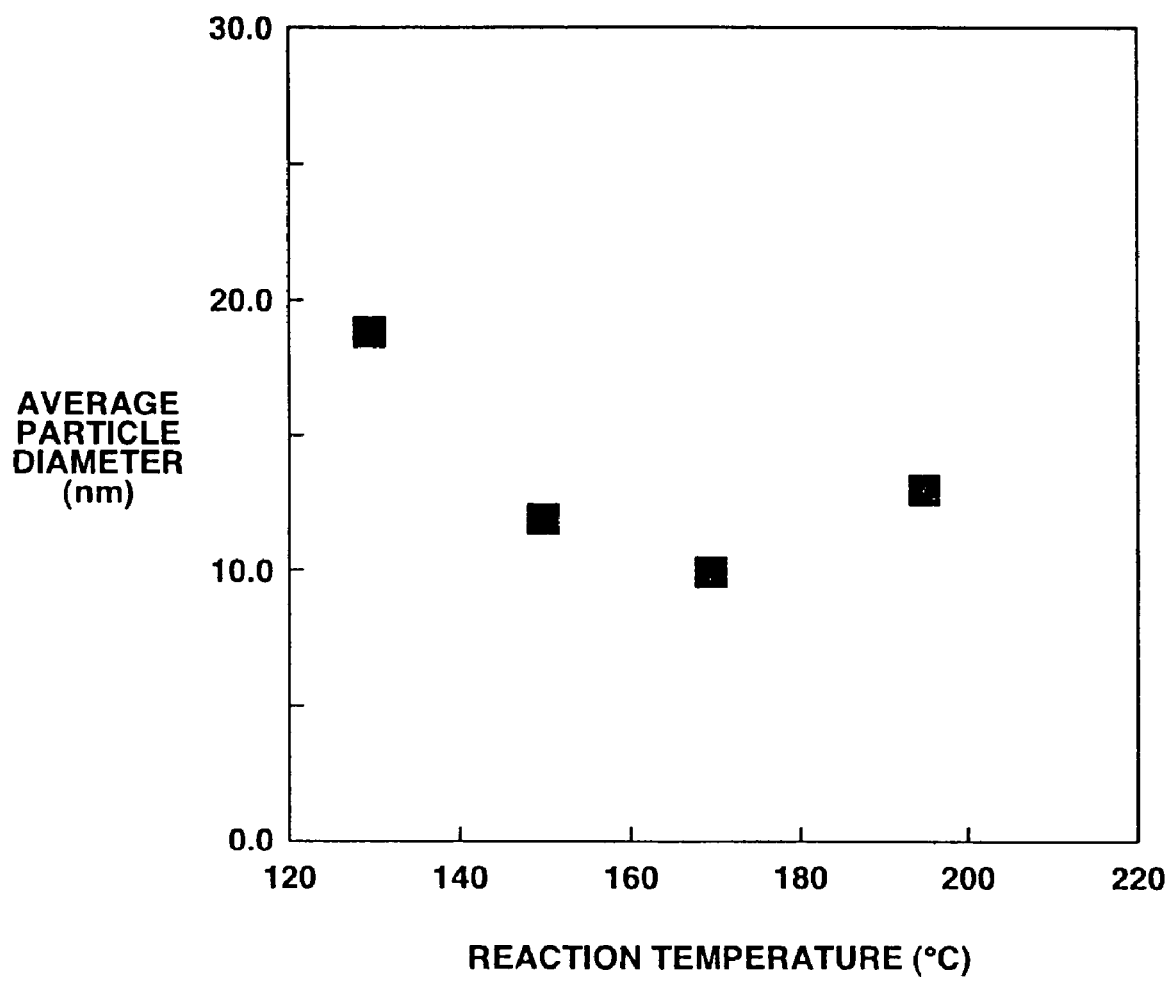
FIG. 8 shows a relation between the reaction temperature and the average particle diameter obtained in the Examples 5 to 8.

The relations between the reaction temperatures and the saturation magnetizations or the average particle diameters obtained in the above-described Examples are shown in FIGS. 5 to 8. Here, FIG. 5 shows the relation between the reaction temperatures and the saturation magnetizations obtained in the Examples 1 to 4. FIG. 6 shows the relation between the reaction temperatures and the average particle diameters obtained in the Examples 1 to 4. FIG. 7 shows the relation between the reaction temperatures and the saturation magnetizations obtained in the Examples 5 to 8. FIG. 8 shows the relation between the reaction temperatures and the average particle diameters obtained in the Examples 5 to 8.

In manufacturing the magnetic particle having the structure that the peripheries of the Fe particles are surrounded by the PVP, as the reaction temperature becomes high, the saturation magnetization increases as shown in FIG. 5. On the other hand, as the reaction temperature becomes high, the average particle diameter decreases as shown in FIG. 6.

Further, upon manufacturing the magnetic particle having the structure that the peripheries of the Co particles are surrounded by the PVP, as the reaction temperature becomes high, it is recognized that the saturation magnetization is liable to be increased as shown in FIG. 7, however, the degree of increase in the saturation magnetization is not higher than that in the case of the Fe particles. On the other hand, as the reaction temperature becomes high, it is recognized that the average particle diameter is apt to be decreased as shown in FIG. 8.

As described above, in the method for producing a magnetic particle according to this embodiment, the magnetic particle having a structure that the surface is surrounded by the chain polymer such as the PVP can be efficiently produced by a wet method. In case the magnetic particle having such a structure is employed for a magnetic material, when the magnetic particles are connected together in a network form, there is formed a nanogranular structure that grain boundary layers of high resistance due to the chain polymer exist between the magnetic particles.

In the above description, although the magnetic particle composed of Fe, Co or Ni as a single metal component is manufactured, the organometallic complex or the metal salt of an Fe group may be mixed with the organometallic complex or the metal salt of a Co group and the mixture may be used as a starting raw material to form a magnetic particle composed of Fe particles and Co particles. Similarly, the organometallic complex or the metal salt of the Fe group may be mixed with the organometallic complex or the metal salt of an Ni group and the mixture may be used as a starting raw material to manufacture a magnetic particle composed of Fe particles and Ni particles. At that time, the ratio of components Fe to Co or Fe to Ni can be arbitrarily selected in accordance with the characteristics or the use of a desired magnetic material.

Since the magnetic material composed of the magnetic particles obtained by the above-described method has a nanogranular structure and exhibits a property for absorbing electric waves, it can be applied to various kinds of parts of a communication devices. Especially, since the magnetic material can absorb electromagnetic waves in a high frequency area, as its application form, magnetic powder as a filler may be preferably mixed with a resin with good fluidity to obtain paste or a semiconductor mold. Further, as a high frequency package, the magnetic material can be likewise used for the purpose of preventing the interference of a signal in a semiconductor device.

Further, the magnetic material has an extremely high absorbing performance of electromagnetic waves in a low frequency area, so that the magnetic material can be preferably applied to uses such as an electromagnetic shield, an inductor, a transformer, etc.

Additionally, two or more kinds of different magnetic powder are mixed together so that a certain property can be improved or a plurality of kinds of characteristics can be achieved.

As one of application examples, a magnetic sheet formed by mixing the magnetic powder with a polymer material will be described below.

The magnetic sheet produced from the magnetic powder and the polymer material is manufactured by mixing the magnetic powder with the polymer material in such a manner as to include the magnetic powder having a volume filling rate of 30% to 90% (the rest is composed of the polymer material). As the polymer materials forming the magnetic sheet, there may be used biodegradable polymer materials such as polylactate, poly-b-hydroxybutyrate, polybutylene succinate, polyethylene succinate, polycaprolactone, etc. Thus, there can be manufactured the magnetic sheet low in its environmental load in a waste treatment, or the like.

Figure 9:
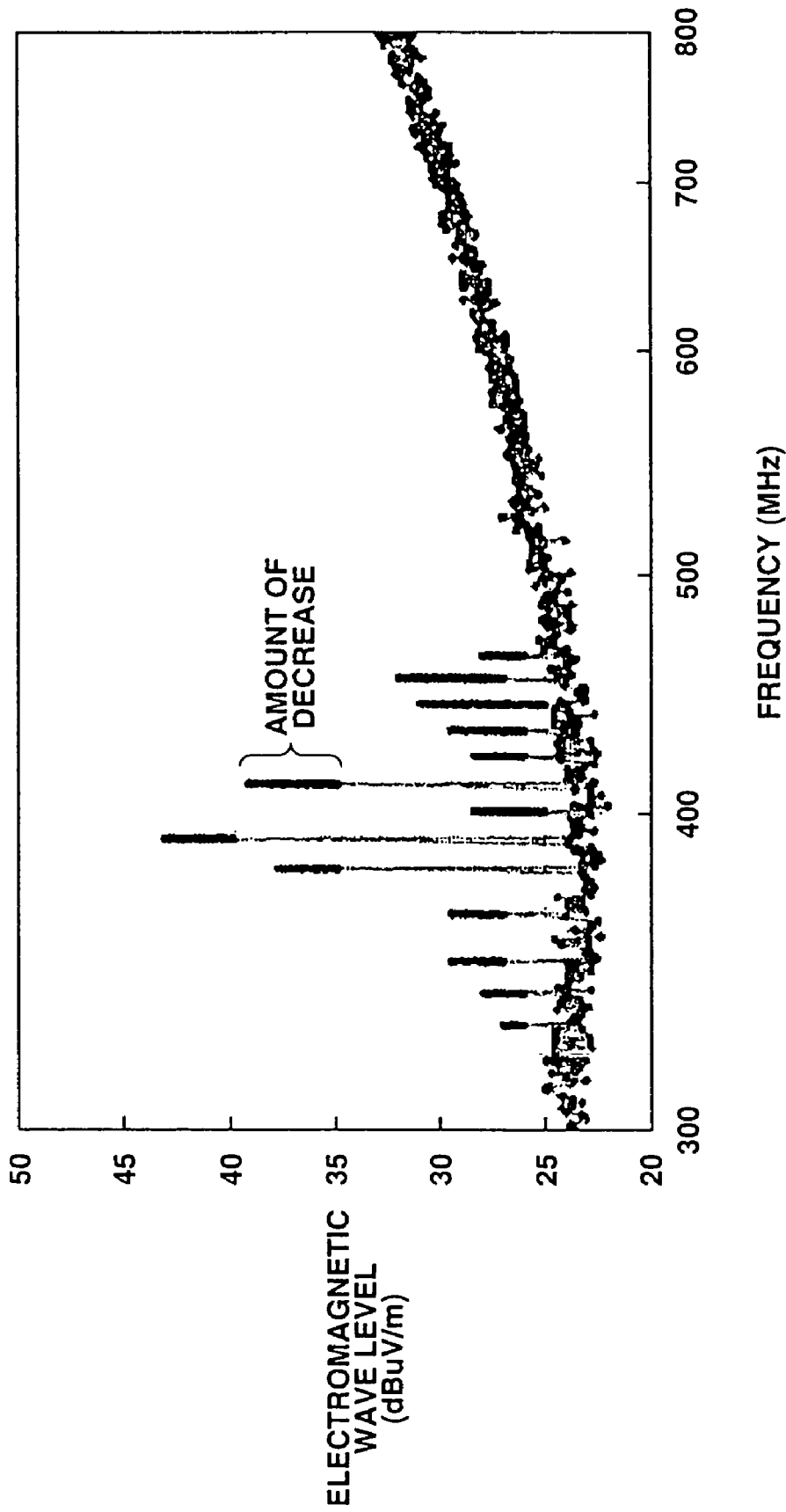
FIG. 9 shows the measured results of the levels of electromagnetic waves emitted from a communication device using a magnetic sheet.

FIG. 9 shows the measured results of levels of electromagnetic waves emitted from a communication device using the magnetic sheet. FIG. 9 shows the measured values of the levels of electromagnetic waves for respective frequencies emitted from the device when the magnetic sheet is mounted on a casing of the communication device. For comparison, the levels of electromagnetic waves obtained when the magnetic sheet is not mounted on the device are also measured. FIG. 9 likewise shows the differences between the levels of electromagnetic waves emitted when the magnetic sheet is not mounted on the communication device and the levels of electromagnetic waves emitted when the magnetic sheet is mounted on the communication device.

In FIG. 9, an axis of abscissa shows frequency and an axis of ordinate shows the level of electromagnetic wave emitted from the communication device. The magnetic sheet is mounted on the communication device so that the level of electromagnetic waves emitted therefrom is decreased. The emission of unnecessary electromagnetic waves from the communication device can be reduced by the amount of decrease.

A magnetic sheet made of the magnetic powder and the polymer material and having the thickness of 10 µm to 2 mm also has an effect for reducing the emission of the unnecessary electromagnetic waves.

Further, the magnetic powder and the polymer material are mixed together and the mixture may be used for a variety of radio wave absorber parts such as a radio wave absorber casing, a radio wave absorbing screen, a radio wave absorbing wall, a radio wave absorbing substrate, a radio wave absorbing molded product, a radio wave absorbing package, etc. as well as the magnetic sheet.

Further, since the magnetic powder has its surface surrounded by the PVP and insulated, a die can be directly filled with the magnetic powder to be molded. At that time, since the magnetic particles are small, a moldability is not necessarily excellent. However, the magnetic powder is compressed by using a suitable lubricant such as stearic acid, and accordingly, the magnetic powder can be used as the magnetic material having the nanogranular structure.

This magnetic material includes the magnetic particles whose volume filling rate is about 60% at maximum. The magnetic powder including the magnetic particles of large particle size is mixed with the magnetic powder of small particle size to obtain an optimum volume filling rate so that the volume filling rate can be further increased. For instance, the magnetic powder having the average particle diameter of 7 nm is mixed with the magnetic powder having the average particle diameter of 1 nm, so that the volume filling rate of the magnetic particles of about 80% can be achieved.

Figure 10:
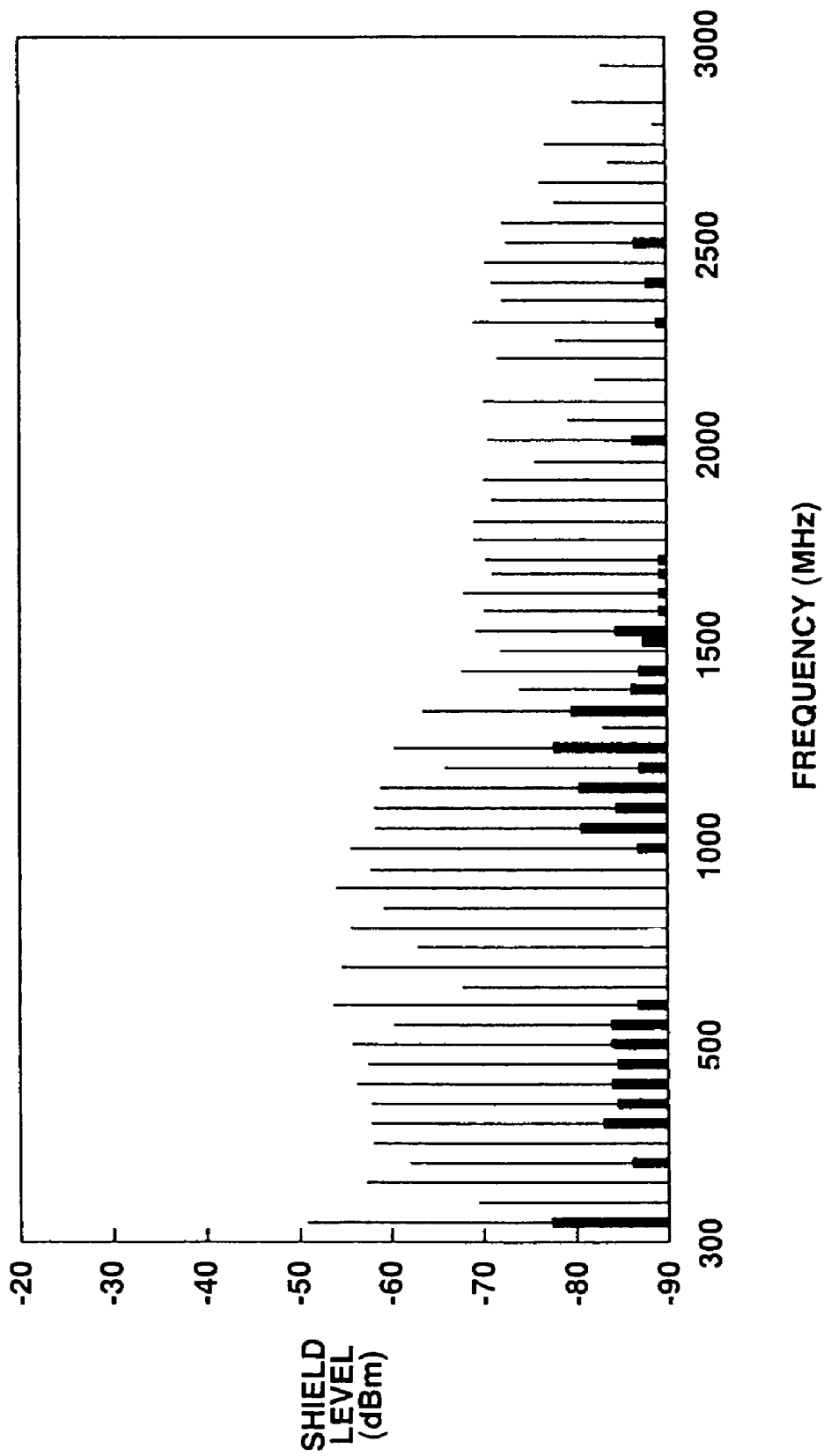
FIG. 10 shows the measured results of the shield levels of electromagnetic waves by an IC package using a magnetic material.

As an application example of such a magnetic material, an instance in which the magnetic material is used for an IC package will be described below. FIG. 10 shows the measured results of the shield levels of electromagnetic waves in the IC package using the magnetic material. For comparison. the measured values of shield levels of electromagnetic waves by the IC package including no magnetic material are also shown in FIG. 10. In FIG. 10, the measured values obtained when the magnetic material is included in the IC package are shown by thick lines and the measured values when the magnetic material is not included in the IC package are shown by thin lines.

Referring FIG. 10, an axis of abscissa shows frequency and an axis of ordinate shows the shield level of electromagnetic waves. When the magnetic material is included in the IC package, a shield effect is higher throughout all frequency areas than that obtained when the magnetic material is not included in the IC package, and a high electromagnetic wave shield effect is achieved. An electromagnetic wave shield performance in the high frequency areas is remarkably higher than that in a conventional case, which is specifically worthy of attention.

The above-described magnetic material can be used not only for the IC package, but also for a variety of filters such as a band-pass filter, a high-pass filter, a low-pass filter, etc. or a variety of parts of a transformer, a common mode choke coil, an inductor, etc.

As described above, according to the present invention, a magnetic particle is produced by carrying out steps of: mixing an organometallic complex or a metal salt with a chain polymer and dissolving the mixture in a solvent; raising the temperature of the solution to reaction temperature; carrying out a reaction at the reaction temperature and forming the magnetic particle having a structure that the peripheries of fine particles formed from the organometallic complex or the metal salt are surrounded by the chain polymer. Thus, the magnetic particles forming the magnetic material capable of absorbing electromagnetic waves can be efficiently produced under a wet reaction.

What is claimed is:

1. Magnetic particles forming a magnetic material for absorbing electromagnetic waves, wherein the magnetic particles have a diameter located within a range of 1 nm to 50 nm; and a chain polymer surrounding individual ones of the magnetic particles being formed to a thickness of 1 nm or less.

2. The magnetic particles according to claim 1, wherein the magnetic particles are comprised of iron (Fe), cobalt (Co) or nickel (Ni).

3. The magnetic particles according to claim 1, wherein the chain polymer is poly(N-vinyl-2-pyrrolidone).

4. The magnetic particles according to claim 1, wherein the chain polymer is polyacrylic acid.

5. A magnetic material for absorbing electromagnetic waves comprising: powder comprised of magnetic particles having a diameter of from 1 nm to 50 nm and the magnetic particles are each individually surrounded by a chain polymer that is formed to a thickness of 1 nm or less.

6. The magnetic material according to claim 5, wherein the polymer material is a biodegradable material.

7. The magnetic material according to claim 5, wherein the magnetic material is formed of a sheet type material having the thickness of 10 μm to 2 mm comprised of the magnetic particles each individually bonded with a chain polymer and surrounded by a further resin material.

8. A magnetic material for absorbing electromagnetic waves formed by pressing a powder comprised of magnetic particles that are each individually surrounded by a chain polymer that is formed to a thickness of 1 nm or less.

* * * * *